dene chloride polymers and copolymers are rather sensitive to heat, and cannot be melt-extruded without the addition of heat-stabilizing agents. The requirements for such a heat-stabilizing agent are rather exacting. First, the agent must be capable of stabilizing the resins at the high temperature and for the extended periods involved in the extrusion process, and must not itself be affected by these conditions. Secondly, the heat stabilizer must be compatible with the resin, both in the fused and in the solidified states. Finally, the heat stabilizer must not be antagonistic toward the plasticisers, light stabilizers and other compounding ingredients which must be incorporated into the resins.

Accordingly, it is an object of this invention to provide novel and satisfactory vinylidene chloride resin compositions.

Another object is to provide a novel heat stabilizer for vinylidene chloride resins.

A further object is to provide a novel combination, with said stabilizer, of other compounding ingredients having particularly advantageous properties.

SYNOPSIS OF THE INVENTION

The above and other objects are secured, in accordance with this invention, by the incorporation, into 100 parts by weight of a vinylidene chloride resin, or from 0.5 to 3.0 parts of barium ricinoleate. The resultant compositions have outstanding resistance to degradation by heat and mechanical working, and tolerate any of the other compounding agents—plasticisers, lubricants, heat stabilizers etc.—known as being suitable for use in vinylidene chloride resins. The stabilizer of this invention yields particularly favorable results in combination with diphenyl ether and glycidyl phenyl ether, the resultant preferred compositions lying within the following limits, all parts being given by weight:

TABLE I

| | Parts |
|---|---|
| Vinylidene chloride polymer or copolymer | 100 |
| Diphenyl ether | 5–10 |
| Glycidyl phenyl ether | 1–3 |
| Barium ricinoleate | 1–3 |

These specific preferred compositions, besides having the excellent heat resistance of the barium ricinoleate obtained in accordance with the broader aspects of this invention, have particularly desirable extrusion and other working properties.

THE VINYLIDENE CHLORIDE POLYMERS AND COPOLYMERS

The resins forming the basis of the compositions of this invention are a well-known class of polymers of vinylidene chloride and copolymers thereof with not more than 15% of other unsaturated compounds copolymerizable therewith, and correspondingly containing at least 85% of vinylidene chloride copolymerized therein. Such resins are characterized by crystalline behavior, i. e. they fuse sharply to form relatively fluid melts which may be extruded, quenched and oriented to form strong filaments of crystalline character. A syndrome of this crystalline habit is the recalcitrance of these resins to compounding: the macromolecules of polyvinylidene chloride prefer contact with each other and tend to reject any foreign substances such as plasticisers, stabilizers and the like. It is therefore very difficult to provide suitable compounding agents for these resins, and in particular to provide mutually compatible combinations of plasticisation, heat stabilization and age resistance. The barium recinoleate involved in the applicants' composition is readily compatible with these resins and does not interfere with any of the known other compounding ingredients used with vinylidene chloride.

As noted above, the base resin may be a homopolymer of vinylidene chloride, or a copolymer thereof with other unsaturated compounds, which copolymers must contain at least 85% of vinylidene chloride copolymerized therein based on the total weight of the copolymer. Suitable comonomers for this purpose include for example vinyl chloride, vinyl fluoride, vinyl acetate, styrene, acrylic and methacrylic esters such as methyl methacrylate, ethyl acrylate and the like, acrylonitrile, methacrylonitrile, vinyl ethers and ketones such as methyl vinyl ether, methyl vinyl ketone and related compounds such as methyl isopropenyl ketones and the like. For a more complete list of compounds known to copolymerize with vinylidene chloride see Krczil "Kurzes Handbuch der Polymerisationstechnik" vol. II "Mehrstoffpolymerization" Edwards Bros. Inc. p. 739, the items indented under "vinylidene chlorid."

SUBSIDIARY COMPOUNDING INGREDIENTS

As noted above, the present invention is directed principally to the stabilization of the vinylidene chloride resins against heat, and not to the imparting of any other benefit to the resin. In order to plasticise the resins, or to render the same more resistant to light (as in filaments extruded therefrom and destined for applications involving exposure to weathering) specific additional ingredients must be incorporated into the resin. The barium ricinoleate of this invention is particularly advantageous in that it is not antagonistic to any of these other ingredients commonly employed, i. e., it will not interfere with the function of these other agents, nor will it cause them to effloresce on the surface of the articles ultimately made from the compositions. A number of materials are used as light stabilizers, plasticisers and other compounding agents in vinylidene chloride resins and may be used in conjunction with the barium ricinoleate of this invention, typical materials of this sort being chlorinated benzenes, naphthalenes and diphenyls; aryl and aralkyl ethers, particularly those containing an epoxypropyl group; dihydroxy-benzophenones; phenolic compounds; and aryl and alkylated aryl salicylates. In addition, several other ingredients, not claimed in the present application, such as liquid low molecular weight poly-alpha-methyl styrenes having viscosities at 60° C. ranging from 50 to 1000 centipoises, condensates or bisphenol A with epichlorohydrin (believed to have the structure,

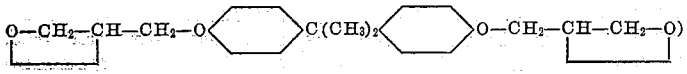

aromatic hydrocarbon condensates from petroleum fractions, etc. Barium ricinoleate is likewise compatible, and non-interfering, with these latter compounding ingredients.

As also noted above, the invention in one of its specific aspects relates to a particularly favorable combination of the barium ricinoleate with diphenyl ether and glycidyl phenyl ether within the compositional limits set out in Table I above. These specific compositions are characterized by particularly smooth extrusion and orientation behavior; ability to withstand normal extrusion temperatures (320–340° F.) for extended periods of time; and ability to withstand even higher temperatures, such as result from temporary excursions of the control equipment, for periods of time sufficient for restoration of the proper extruding conditions.

With the foregoing general discussion in mind, there are given herewith detailed examples of the practice of this invention. All parts given are by weight.

Example I

| | Parts |
|---|---|
| Vinylidene chloride resin (copolymer of 85% vinylidene chloride, 15% vinyl chloride) | 100 |
| Diphenyl ether | 8 |
| Barium ricinoleate | 1 or 2 |
| Glycidyl phenyl ether | 1 or 2 |

Two compositions were made up in accordance with the foregoing, one containing one part each of the barium ricinoleate and glycidyl phenyl ether, and the other containing two parts each of these compounds. In each case, the several ingredients were slurried together with petroleum ether, and the slurry dried. The dried slurry was then ball-milled for 20 minutes, and compression molded at 335° F. to form a solid preform button which was then extruded in a piston-type laboratory extruder into a water-quenching bath and thereafter oriented by passage successively over snubbing and stretching rolls. Conditions of extrusion and orientation were as follows:

TABLE II

| | |
|---|---|
| Temperature of piston chamber heating medium | 365° F. |
| Piston displacement | 0.652 ml. per minute |
| Die construction | nickel, with .020 inch diameter orifice |
| Temperature of die | 320° F. |
| Rate of withdrawal of filament from die before quench | 15 feet per minute |
| Temperature of quenching bath | 15° C. |
| Filament orientation | 400% |
| Diameter of filament | 8 mils |

Samples of the oriented filament were removed during each run at intervals of 5, 15 and 30 minutes from the beginning of operation, and subjectively rated by the operator as to appearance. Each run was continued until the resin in the extruder began to decompose, which time was recorded as the decomposition time. Set forth in Table III are the observations made.

TABLE III

| Parts of Barium Ricinoleate and of Glycidyl Phenyl Ether Used | 1 | 2 |
|---|---|---|
| Decomposition time (minutes) | 25 | 35 |
| Appearance of filament during extrusion, at the end of: | | |
| 5 minutes | Good | Excellent. |
| 15 minutes | Fair | Do. |
| 30 minutes | | Good. |
| End of run | Poor | Poor. |

Example II

A

| | Parts |
|---|---|
| Vinylidene chloride resin (copolymer of 85% vinylidene chloride, 15% vinyl chloride) | 100 |
| Alpha-methyl styrene polymer (low molecular weight, viscosity 100 centipoises at 60° C.) | 8 |
| Glycidyl phenyl ether | 2 |
| Barium ricinoleate | 2 |

B

| | Parts |
|---|---|
| Vinylidene chloride resin (copolymer of 85% vinylidene chloride, 15% vinyl chloride) | 100 |
| Panaflex BN-1 (an aromatic hydrocarbon condensate manufactured by Pan American Chemicals Corp.) | 8 |
| Condensate, under etherification conditions, of bisphenol A with epichlorohydrin (largely a diether of the formula 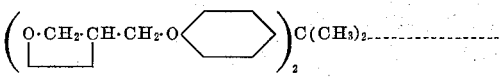 | 2 |
| Barium ricinoleate | 2 |

Two compositions were made up, one in accordance with each of the recipes A and B above. Each composition was extruded and oriented by the process described in Example I. The following observations were made.

TABLE IV

| Recipe Used | A | B |
|---|---|---|
| Decomposition time (minutes) | 37 | 26 |
| Appearance of filament during extrusion at the end of: | | |
| 5 minutes | good | excellent. |
| 15 minutes | fair | Do. |
| 30 minutes | do | |
| end of run | do | poor. |

From the foregoing general description and detailed specific examples, it will be evident that this invention provides novel stabilized vinylidene chloride resin compositions susceptible of ready processing to produce fibers and other products of excellent properties appearance and stability. The several compounding ingredients involved are cheaply and readily available.

What is claimed is:

1. A heat-stable, smoothly melt-extrudable composition comprising by weight:

| | Parts |
|---|---|
| A crystalline vinylidene chloride resin | 100 |
| Diphenyl ether | 5–10 |
| Glycidyl phenyl ether | 1–3 |
| Barium ricinoleate | 1–3 | said vinylidene chloride resin being selected from the group consisting of polymers of vinylidene chloride and copolymers thereof with other unsaturated compounds copolymerizable therewith containing at least 85% of vinylidene chloride copolymerized therein.

2. A heat-stable, smoothly melt-extrudable composition comprising, by weight:

| | Parts |
|---|---|
| A crystalline vinylidene chloride resin | 100 |
| Diphenyl ether | 8 |
| Glycidyl phenyl ether | 2 |
| Barium ricinoleate | 2 | said vinylidene chloride resin being a copolymer of 85% by weight of vinylidene chloride with 15% by weight of vinyl chloride.

3. An oriented-crystalline resinous filament comprising by weight:

| | Parts |
|---|---|
| A crystalline vinylidene chloride resin | 100 |
| Diphenyl ether | 5–10 |
| Glycidyl phenyl ether | 1–3 |
| Barium ricinoleate | 1–3 | said vinylidene chloride resin being a copolymer of 85% by weight of vinylidene chloride with 15% by weight of vinyl chloride.

4. An oriented-crystalline resinous filament comprising by weight:

| | Parts |
|---|---|
| A crystalline vinylidene chloride resin | 100 |
| Diphenyl ether | 8 |
| Glycidyl phenyl ether | 2 |
| Barium ricinoleate | 2 | said vinylidene chloride resin being a copolymer of 85% by weight of vinylidene chloride with 15% by weight of vinyl chloride.

JACOB D. MATLACK.
ROBERT J. REID.

REFERENCES CITED

The following references are of record in the file of this patent:

UNITED STATES PATENTS

| Number | Name | Date |
|---|---|---|
| 2,233,442 | Wiley | Mar. 4, 1941 |
| 2,564,646 | Leistner et al. | Aug. 14, 1951 |

OTHER REFERENCES

Modern Plastics, Dec. 1949, pages 111–112.